(12) United States Patent
Kato

(10) Patent No.: US 7,064,877 B2
(45) Date of Patent: Jun. 20, 2006

(54) SCANNING OPTICAL APPARATUS AND IMAGE FORMING APPARATUS USING THE SAME

(75) Inventor: Manabu Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/725,398

(22) Filed: Dec. 3, 2003

(65) Prior Publication Data

US 2004/0109211 A1    Jun. 10, 2004

(30) Foreign Application Priority Data

Dec. 3, 2002  (JP)  ............................. 2002-350684

(51) Int. Cl.
*G02B 26/08* (2006.01)

(52) U.S. Cl. ...................... 359/204; 250/236
(58) Field of Classification Search ........ 359/204–207; 250/234–236; 347/233, 235, 243, 244
See application file for complete search history.

(56) References Cited

U.S. PATENT DOCUMENTS

| | | | | |
|---|---|---|---|---|
| 5,543,955 A | * | 8/1996 | Yamazaki et al. .......... | 359/204 |
| 5,557,446 A | | 9/1996 | Kato .......................... | 359/206 |
| 5,602,578 A | * | 2/1997 | Sumiyoshi et al. ......... | 347/232 |
| 5,963,356 A | | 10/1999 | Kato .......................... | 359/216 |
| 5,966,161 A | | 10/1999 | Kato .......................... | 347/258 |
| 5,995,131 A | | 11/1999 | Fujibayashi et al. ........ | 347/258 |
| 6,038,053 A | | 3/2000 | Kato .......................... | 359/205 |
| 6,094,286 A | | 7/2000 | Kato .......................... | 359/206 |
| 6,133,935 A | | 10/2000 | Fujibayashi et al. ........ | 347/258 |
| 6,154,245 A | | 11/2000 | Kato .......................... | 347/244 |
| 6,424,446 B1 | | 7/2002 | Toyoda et al. ............. | 359/205 |
| 6,469,818 B1 | | 10/2002 | Kato .......................... | 359/204 |
| 6,542,278 B1 | | 4/2003 | Kato .......................... | 359/205 |
| 2002/0149668 A1 | | 10/2002 | Kato .......................... | 347/244 |
| 2003/0025784 A1 | | 2/2003 | Sato et al. .................. | 347/244 |
| 2003/0043442 A1 | | 3/2003 | Ishihara et al. ............. | 359/205 |
| 2003/0048352 A1 | | 3/2003 | Kato et al. ................. | 347/258 |
| 2003/0053185 A1 | | 3/2003 | Ishihara et al. ............. | 359/205 |
| 2003/0128270 A1 | | 7/2003 | Kato .......................... | 347/233 |
| 2004/0027446 A1 | | 2/2004 | Kato et al. ................. | 347/228 |

* cited by examiner

FOREIGN PATENT DOCUMENTS

JP    3254367    2/2002

*Primary Examiner*—Euncha P. Cherry
(74) *Attorney, Agent, or Firm*—Fitzpatrick, Cella, Harper & Scinto

(57) ABSTRACT

A scanning optical device including: a light source unit; a first optical element that inputs a light flux emitted from the light source unit to output the light flux; a second optical element that converts the light flux emitted from the first optical element into a longitudinal linear image in a main scanning direction; a deflection element that deflects the light flux emitted from the second optical element for scanning; a third optical element that guides the light flux deflected by the deflection element to a surface to be scanned; a synchronous detection element that obtains a synchronous signal; and a fourth optical element that guides the light flux from the deflection element to the synchronous detection element, in which the second optical element and the fourth optical element are independent of each other; and in the case where a point at which a main light beam traveling toward a scanning center on the surface to be scanned is deflected by the deflection element is assumed as a reference point, the second optical element is located at a position which is farther from the reference point than the fourth optical element.

8 Claims, 7 Drawing Sheets

SCANNING OPTICAL APPARATUS AND IMAGE FORMING APPARATUS USING THE SAME

BACKGROUND OF THE INVENTION

1. Field of the Invention

The present invention relates to a scanning optical device and an image forming apparatus using the same. In particular, the present invention relates to a scanning optical device suitable for an image forming apparatus such as a laser beam printer, a digital copying machine, or a multifunction printer, which has, for example, an electrophotographic process, in which a light flux emitted from light source means is deflected on an optical deflector (polygon mirror) serving as a deflection element and then a surface to be scanned is scanned with the light flux through a scanning optical element having an fθ characteristic to thereby record image information.

2. Related Background Art

Up to now, in a scanning optical device used for a laser beam printer (LBP) or the like, image recording is conducted through the following process. A light flux which is modulated according to an image signal in light source means and emitted therefrom is periodically deflected on, for example, an optical deflector composed of a rotating polygonal mirror (polygon mirror). Then, the deflected light flux is converged in a spot shape onto a photosensitive recording medium (photosensitive drum) by a scanning optical element having an fθ characteristic, to thereby scan the surface of the recording medium is scanned with the light flux.

FIG. 8 is a schematic view showing a main part of a conventional scanning optical device. In FIG. 8, a divergent light flux emitted from light source means 91 is converted into a substantially parallel light flux by a collimator lens 92. The substantially parallel light flux (the amount of light) is limited by an aperture stop 93 and incident into a cylindrical lens 94 having refractive power only in the sub scanning direction. Of the substantially parallel light flux incident into the cylindrical lens 94, a light flux within the main scanning section exits from the cylindrical lens 94 without being changed in its optical state; a light flux within the sub scanning section is converged and imaged as a substantially linear image near a deflection surface 95a of an optical deflector 95 composed of a rotating polygonal mirror (polygon mirror).

The light flux which is reflected and deflected on the reflection surface 95a of the optical deflector 95 is guided onto a photosensitive drum surface 97 serving as a surface to be scanned through a scanning optical element (scanning lens system) 96 having an fθ characteristic while the optical deflector 95 is rotated in a direction indicated by an arrow A. Accordingly, the photosensitive drum surface 97 is scanned with the light flux in a direction indicated by an arrow B (main scanning direction) to thereby record image information.

At this time, a part of the light flux (BD light flux), which is reflected and deflected on the optical deflector 95, is returned using a synchronous detection mirror (BD mirror) 81 through the scanning lens system 96 and incident into synchronous detection unit 84. The synchronous detection unit 84 includes: a slit (BD slit) 82 serving as synchronous position determining means which is located at a position optically equivalent to the photosensitive drum surface 97; and a synchronous detection element (BD sensor) 83. A timing of a writing start position (scanning start position) on the photosensitive drum surface 97 in the main scanning direction is adjusted based on a synchronous signal obtained from the synchronous detection unit 84. Therefore, a scanning line is produced on the photosensitive drum surface 97 to conduct image recording.

In recent years, with a tendency of size reduction of the main body of the image forming apparatus, a compact optical system is required for the scanning optical device. In particular, the synchronous detection optical system (BD optical system) that adjusts the timing of the scanning start position is desired to be more compact because of a limitation on leading of electric wirings from the BD sensor and a limitation on arrangements in a casing (optical box).

In general, the BD optical system uses a portion (end) of the scanning lens, images a part of the light flux (BD light flux) deflected on the optical deflector at a position where the BD sensor is disposed or in the vicinity thereof to adjust the timing of the scanning start position.

An example in which a size of such BD optical system is reduced is disclosed in, for example, Japanese Patent No. 3254367. Japanese Patent No. 3254367 discloses an optical system in which the synchronous detection optical element (BD lens) is composed of an independent anamorphic lens and the BD lens is disposed at a position further apart from the optical deflector than the scanning lens.

The optical system according to Japanese Patent No. 3254367 is effective in reducing a size of the BD optical system and a cost thereof. However, because the BD lens is disposed at a position farther apart from the optical deflector than the scanning lens, the distance between the BD lens and the BD sensor becomes shorter. Thus, there is a problem in that the synchronous detection cannot be conducted with high precision.

SUMMARY OF THE INVENTION

An object of the present invention is to provide a scanning optical device having a compact and simple structure, in which the coupling efficiency of a collimator lens can be improved without reducing the precision of synchronous detection of a scanning start position on a surface to be scanned, and to provide an image forming apparatus using the scanning optical device.

A scanning optical apparatus according to the present invention includes:

light source means;

a first optical element that inputs a light flux emitted from the light source means to output the light flux;

a second optical element that converts the light flux emitted from the first optical element into a longitudinal linear image in a main scanning direction;

a deflection element that deflects the light flux emitted from the second optical element for scanning;

a third optical element that guides the light flux deflected by the deflection element to a surface to be scanned;

a synchronous detection element that obtains a synchronous signal; and a fourth optical element that guides the light flux deflected by the deflection element to the synchronous detection element, in which the second optical element and the fourth optical element are independent of each other, and in a case where a point at which a main light beam traveling toward a scanning center on the surface to be scanned is deflected by the deflection element is assumed as a reference point, the second optical element is located at a position which id farther from the reference point than the fourth optical element.

DESCRIPTION OF THE PREFERRED EMBODIMENTS (Embodiment 1)

Figure 1:
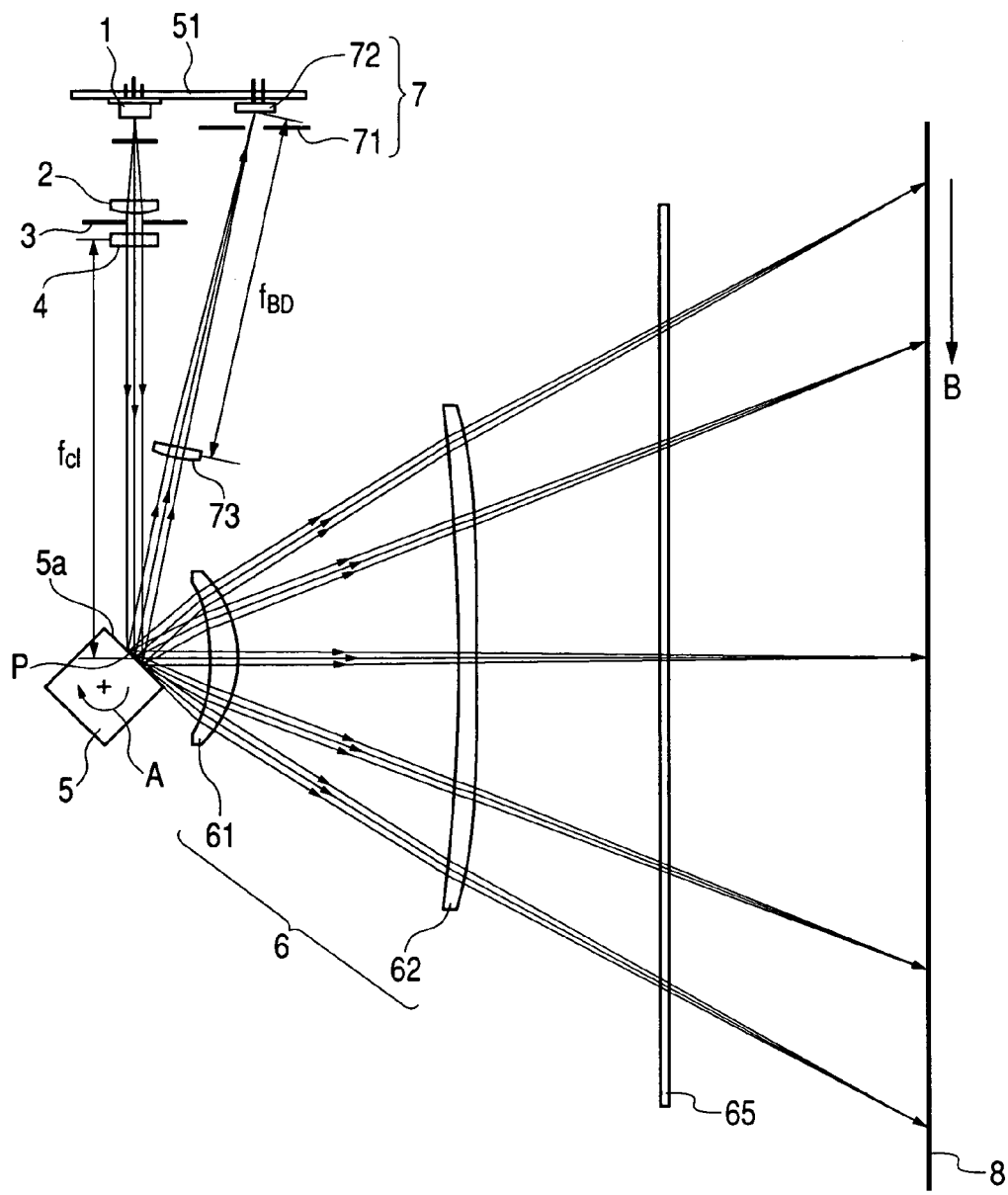
FIG. 1 is a main scanning sectional view showing Embodiment 1 of the present invention.
Figure 2:
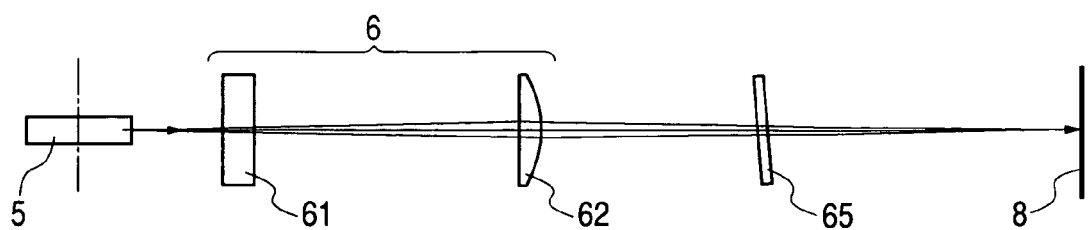
FIG. 2 is a sub scanning sectional view showing Embodiment 1 of the present invention.

FIG. 1 is a main part sectional view showing a scanning optical device in a main scanning direction, according to Embodiment 1 of the present invention (main scanning sectional view). FIG. 2 is a main part sectional view showing the scanning optical device of FIG. 1 in a sub scanning direction (sub scanning sectional view).

Here, the main scanning direction indicates a direction perpendicular to the rotational axis of a deflection unit and the optical axis of a scanning optical unit (direction of a light flux which is reflected and deflected (which is deflected for scanning) by the deflection unit). A sub scanning direction indicates a direction parallel to the rotational axis of the deflection unit. In addition, a main scanning section indicates a plane which is parallel to the main scanning direction and includes the optical axis of a scanning optical unit. A sub scanning section indicates a plane perpendicular to the main scanning section.

In FIGS. 1 and 2, light source means 1 is composed of, for example, a semiconductor laser. A condenser lens (collimator lens) 2 serving as a first optical element converts a divergent light flux emitted from the light source means 1 into a substantially parallel light flux (or substantially convergent light flux). An aperture stop 3 limits a passing light flux to shape it into a beam form. An optical system (cylindrical lens) 4 serving as a second optical element has predetermined power in only the sub scanning direction. By means of the optical system 4, the light flux passing through the aperture stop 3 is formed into a substantially linear image on a deflection surface (reflection surface) 5a of an optical deflector 5 (described later) within the sub scanning section. Note that elements such as the collimator lens 2, the aperture step 3, and the cylindrical lens 4 compose an element of an incident optical system.

The optical deflector 5 serving as the deflection element is composed of, for example, a polygon mirror having four surfaces (rotating polygonal mirror) and rotated in a direction indicated by an arrow "A" in FIG. 1 at a constant speed by a drive unit such as a motor (not shown).

A scanning lens system (scanning optical system) 6 serving as a third optical element has a condensing function and an fθ characteristic and is composed of a first toric lens 61 and a second toric lens 62, each of which is made of a plastic material. The first toric lens 61 has refractive power mainly in the main scanning direction. The first toric lens 61 is disposed near the optical deflector 5, contributing to composing a compact scanning optical device. The second toric lens 62 has refractive power mainly in the sub scanning direction. The second toric lens 62 is disposed sufficiently apart from the optical deflector 5, reducing manufacturing sensitivity of the lens. The first toric lens 61 and the second toric lens 62 have refractive powers different from each other in the main scanning direction and the sub scanning direction, respectively. In addition, the first toric lens 61 and the second toric lens 62 have a tangle error correcting function in the case where a light flux related to image information, which is reflected and deflected on the optical deflector 5, is imaged onto a photosensitive drum surface 8 serving as a surface to be scanned, and a conjugate relationship is made between the deflection surface 5a of the optical deflector 5 and the photosensitive drum surface 8 within the sub scanning section.

Reference numeral 65 denotes a protection-against-dust glass.

A synchronous detection optical element serving as a fourth optical element (hereinafter indicated as "BD lens") 73 is composed of an anamorphic lens which has different refractive powers within the main scanning section and the sub scanning section and is made of a plastic material. By means of the synchronous detection optical lens, a light flux (BD light flux) is imaged at a position where a synchronous detection element 72 (described later) is disposed or in the vicinity thereof, within the main scanning section. In addition, the BD lens 73 is disposed in a region between an optical path from the light source means 1 to the optical deflector 5 and an optical path from the optical deflector 5 to the surface to be scanned 8.

A synchronous detection unit 7 includes a synchronous detection slit 71 (hereinafter indicated as "BD slit") and an optical sensor serving as the synchronous detection element (hereinafter indicated as "BD sensor") 72. The BD slit 71 is disposed at a position optically equivalent to the photosensitive drum surface 8 and determines a write start position of an image. The synchronous detection unit 7 adjusts a timing of a scanning start position for image recording on the photosensitive drum surface 8 in the main scanning direction, based on a synchronous signal (BD signal) obtained by detecting an output signal from the BD sensor 72.

In this embodiment, the cylindrical lens 4 and the BD lens 73 are independent of each other. In the case where a point at which a main light beam traveling toward the scanning center on the surface to be scanned 8 is deflected on the optical deflector 5 is assumed as a reference point P, the cylindrical lens 4 is located at a position which is farther from the reference point P than the BD lens 73. In other words, a distance from the reference point P, which is a deflection point of a light flux traveling toward the scanning center on the optical deflector 5, to the cylindrical lens 4 is longer than a distance to the BD lens 73.

Note that the BD slit 71 is integrally formed with a holder member that holds the semiconductor laser 1. The BD sensor 72 and the semiconductor laser 1 are both disposed on an electrical board 51. In addition, elements such as the BD lens 73, the BD slit 71, and the BD sensor 72 compose an element of a synchronous detection optical system (hereinafter indicated as "BD optical system").

In this embodiment, a light flux emitted from the semiconductor laser 1 is converted into a substantially parallel light flux by the collimator lens 2. The light flux (the amount of light) is limited by the aperture stop 3 and then incident into the cylindrical lens 4. Of the substantially parallel light flux incident into the cylindrical lens 4, a light flux within the main scanning section is exited without changing its optical state. A light flux within the sub scanning section is converged and imaged as a substantial linear image (linear image extended in the main scanning direction) onto the deflection surface 5a of the optical deflector 5. Then, the light flux which is reflected and deflected on the deflection surface 5a of the optical deflector 5 is imaged in a spot shape onto the photosensitive drum surface 8 through the first toric lens 61, the second toric lens 62, and the protection-against-dust glass 65. At this time, the optical deflector 5 is rotated in a direction indicated by an arrow "A", so that the photosensitive drum surface 8 is optically scanned in a direction indicated by an arrow "B" (main scanning direction) at a constant speed. Thus, image recording is conducted on the photosensitive drum surface 8 composing a recording medium.

At this time, in order to adjust the timing of the scanning start position on the photosensitive drum surface 8 before optical scanning is conducted on the photosensitive drum surface 8, a part of the light flux (BD light flux) which is reflected and deflected on the optical deflector 5 is condensed onto the surface of the BD slit 71 by the BD lens 73 and then guided to the BD sensor 72. Then, the timing of the scanning start position for image recording on the photosensitive drum surface 8 is adjusted based on the synchronous signal (BD signal) obtained by detecting an output signal from the BD sensor 72.

Hereinafter, an increase in precision of the synchronous detection and an improvement in coupling efficiency of the collimator lens will be described.

First, with respect to the increase in precision of the synchronous detection, the synchronous detection precision optically depends on a focal distance $f_{BD}$ of the BD lens 73 within the main scanning section. This is because the focal distance $f_{BD}$ of the BD lens 73 within the main scanning section becomes an angular velocity of a light flux on the BD sensor 72 (or BD slit). The optical synchronous detection precision improves as the focal distance value increases. However, in the case where the focal distance is long, the BD optical system becomes larger, so that the entire device cannot be made compact.

Therefore, according to this embodiment, in the case where a focal distance of the scanning lens system 6 within the main scanning section is given as $f_{f\theta}$ and the focal distance of the BD lens 73 within the main scanning section is given as $f_{BD}$, respective elements are set so as to satisfy a condition, $$f_{f\theta}/3 < f_{BD} < f_{f\theta} \quad (1).$$

Thus, it is possible to make the BD optical system compact while maintaining the increase in precision of the synchronous detection.

Next, with respect to the improvement in coupling efficiency of the collimator lens, in order to improve the coupling efficiency, it is necessary to set F numbers (F No.) of the collimator lens 2 in the main scanning direction and the sub scanning direction to be bright. In addition, there is a limit to the performance of F number of the collimator lens 2. Therefore, in order to maximize the coupling efficiency within limited brightness, it is desirable that the F number in the main scanning direction is made substantially equal to the F number in the sub scanning direction.

However, in many cases, in relation to the optical face tangle error correction, the F number of the collimator lens 2 in the sub scanning direction is set to become darker than the F number thereof in the main scanning direction. In particular, in the case of a scanning lens system which has a smaller imaging magnification within the sub scanning section, such tendency is remarkable. Thus, low coupling efficiency is a problem.

Therefore, according to this embodiment, the F number in the sub scanning direction is set to be no larger than twice as much as the F number in the main scanning direction (a diameter of diaphragm Ds in the sub scanning direction is no smaller than ½ times a diameter of diaphragm Dm in the main scanning direction), thereby improving the coupling efficiency of the collimator lens 2.

In this embodiment, in the case where a spot shape on the surface to be scanned 8 is assumed to be substantially a circle and the F number is given by Fi, a diameter of diaphragm D disposed near the collimator lens 2 is as follows:

main scanning: $Dm = f_{f\theta}/Fi$, sub scanning : $Ds = f_{c1} \times |\beta_{f\theta}|/Fi$.

($f_{c1}$: focal distance of cylindrical lens within sub scanning section, $\beta_{f\theta}$: imaging magnification of scanning lens system within sub scanning section).

In order to set the diameter of diaphragm Ds in the sub scanning direction to a value no smaller than ½ times the diameter of diaphragm Dm in the main scanning direction, it is necessary to satisfy conditions, $Dm/2 < Ds$, $$f_{c1} > f_{f\theta}/(2|\beta_{f\theta}|) \quad (2).$$

Here, in order to achieve both the increase in precision of the synchronous detection and the improvement in coupling efficiency of the collimator lens 2, it is required that both the above-mentioned conditional expressions (1) and (2) are satisfied. That is, as is apparent from the above-mentioned conditional expressions, it is preferable to lengthen both the focal distance $f_{BD}$ of the BD lens 73 within the main scanning section and the focal distance $f_{c1}$ of the cylindrical lens 4 within the sub scanning section.

Therefore, in this embodiment, in order to compactly dispose an optical system while satisfying these conditions, the cylindrical lens 4 and the BD lens 73 each are composed of a separate optical element. In addition, assuming the deflection point P, at which a light flux traveling toward the scanning center is deflected on the optical deflector 5, as a reference, the distance from the deflection point P to the cylindrical lens 4 is made longer than the distance to the BD lens 73.

Note that the distance from the deflection point P to the optical element (lens) indicates an optical path length measured along an actual optical path. In the case where a reflecting mirror is disposed on an optical path to deflect a light flux, the optical path is used for measuring the optical path length.

Parameter values of the respective elements in the scanning optical device according to this embodiment are as follows:

focal distance of scanning lens system within main scanning section $f_{f\theta} = 150$;

imaging magnification of scanning lens system within sub scanning section $|\beta_{f\theta}| = 1.38$;

focal distance of cylindrical lens within sub scanning section $f_{c1} = 94.0$;

focal distance of BD lens within main scanning section $f_{BD}$=76.4.

The above-mentioned parameter values satisfy the conditional expressions (1), and (2).

In this embodiment, the conditions.

$$50 < f_{BD} < 150 \quad (1),$$

$$f_{c1} > 54.4 \quad (2)$$

may be satisfied. Both the focal distance $f_{c1}$ of the cylindrical lens 4 within the sub scanning section and the focal distance $f_{BD}$ of the BD lens 73 within the main scanning section satisfy these conditions.

As described above, according to this embodiment., the cylindrical lens 4 and the BD lens 73 each are composed of a separate optical element. In addition, assuming the deflection point P, at which the light flux traveling toward the scanning center is deflected on the optical deflector 5, as the reference, the distance from the deflection point P to the cylindrical lens 4 is made longer than the distance to the BD lens 73. Thus, the incident optical system and the BD optical system in which the increase in precision of the synchronous detection and the improvement in coupling efficiency of the collimator lens 2 are both achieved can be compactly and simply constructed.

Note that, the scanning lens system 6 is composed of two lenses in this embodiment. However, the present invention is not limited to this. The scanning lens system 6 may be composed of, for example, a single lens or three or more lenses. In addition, the BD sensor and the semiconductor laser are disposed on the same electrical board in this embodiment. However, the present invention is not limited to this. The BD sensor and the semiconductor laser may be disposed on different electrical boards.

(Embodiment 2)

Figure 3:
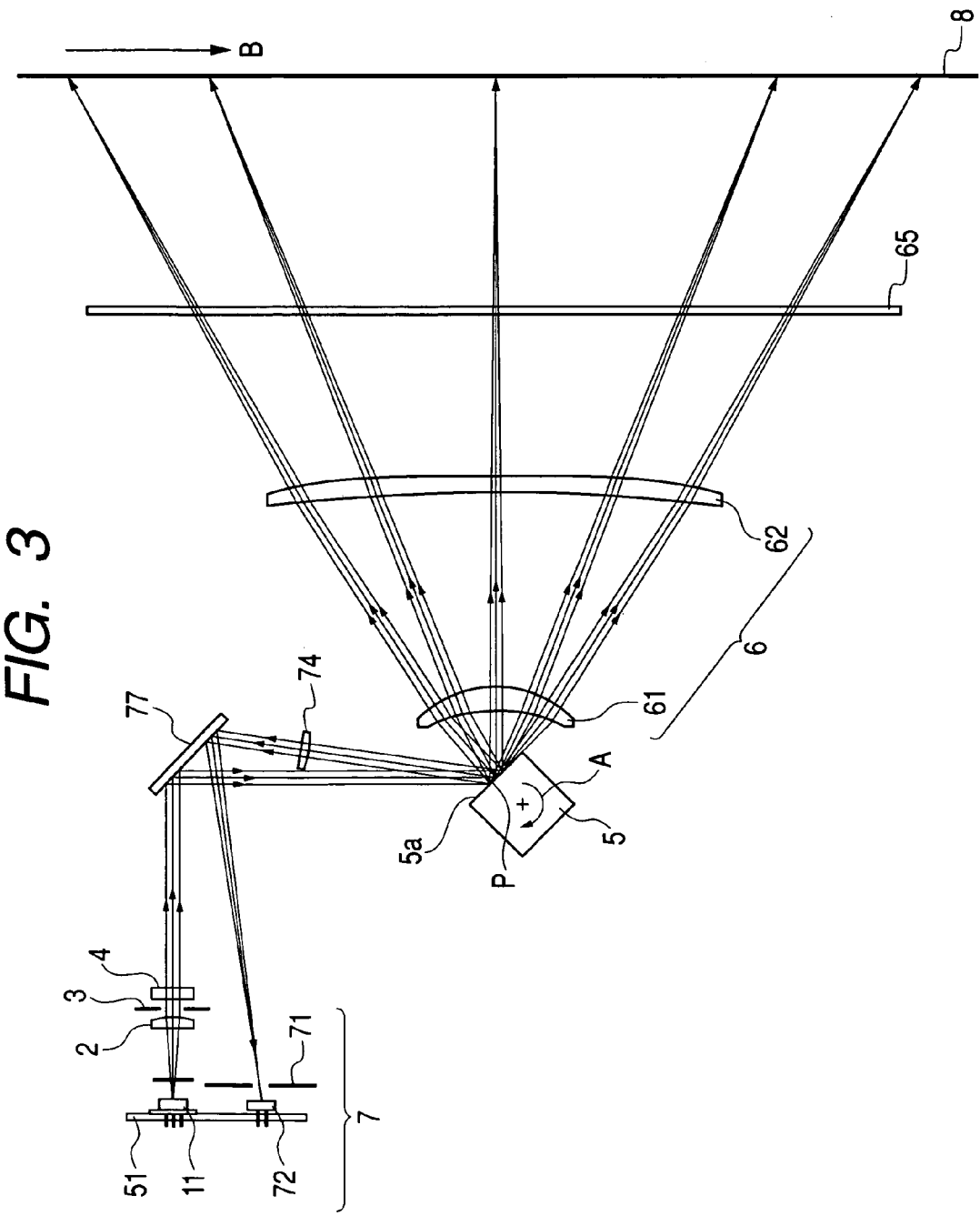
FIG. 3 is a main scanning sectional view showing Embodiment 2 of the present invention.

FIG. 3 is a main part sectional view showing a scanning optical device in the main scanning direction, according to Embodiment 2 of the present invention. In FIG. 3, the same reference numerals are provided to the same elements as shown in FIG. 1.

In this embodiment, points different from the above-mentioned Embodiment 1 are that: a multi-beam semiconductor laser is used as the light source means; a reflecting mirror 77 is disposed in an incident optical system and a BD optical system; and the focal distance of the cylindrical lens 4 and the focal distance of the BD lens 74 are changed accordingly. Other structures and optical actions are substantially the same as Embodiment 1, and the same effect is obtained.

In other words, in FIG. 1, light source means (multi-beam light source) 11 is composed of a separately modulatable multi-beam semiconductor laser. The reflecting mirror 77 changes an optical path and disposed in the incident optical system and the BD optical system. A synchronous detection optical element 74 serving as a fourth optical element (BD lens) is composed of an anamorphic lens which has different refractive powers within the main scanning section and the sub scanning section and is made of a plastic material. By means of the synchronous detection optical lens, a light flux (BD light flux) is imaged at a position where the BD sensor 72 is disposed or at the vicinity thereof, within the main scanning section.

In this embodiment, a plurality of light fluxes which are independently modulated by the multi-beam semiconductor laser 11 and exited therefrom are converted into substantially parallel light fluxes by the collimator lens 2. The substantially parallel light fluxes (the amount of light) is limited by the aperture stop 3 and then incident into the cylindrical lens 4. Of the light fluxes incident into the cylindrical lens 4, light fluxes within the main scanning section are exited without changing their optical state, reflected on the reflecting mirror 77, and incident into the deflection surface 5a of the optical deflector 5. Light fluxes within the sub scanning section are converged, reflected on the reflecting mirror 77, and imaged as a substantial linear image (linear image extended in the main scanning direction) onto the deflection surface 5a of the optical deflector 5. Then, the plurality of light fluxes which are reflected and deflected on the deflection surface 5a of the optical deflector 5 are imaged in spot shapes onto the photosensitive drum surface 8 through the first toric lens 61, the second toric lens 62, and the protection-against-dust glass 65. At this time, the optical deflector 5 is rotated in the direction indicated by the arrow "A", so that the photosensitive drum surface 8 is optically scanned in the direction indicated by the arrow "B" (main scanning direction) at a constant speed. Thus, image recording is conducted on the photosensitive drum surface 8 composing a recording medium.

At this time, in order to adjust the timing of the scanning start position on the photosensitive drum surface 8 before optical scanning is conducted on the photosensitive drum surface 8, a part of the light fluxes (BD light fluxes) which are reflected and deflected on the optical deflector 5 is condensed onto the surface of the BD slit 71 through the reflecting mirror 77 by the BD lens 74 and then guided to the BD sensor 72. Then, the timing of the scanning start position for image recording on the photosensitive drum surface 8 is adjusted based on the synchronous signal (BD signal) obtained by detecting an output signal from the BD sensor 72.

Note that, although not used in this embodiment, an additional optical element may be provided near the BD slit 71 to obtain a substantial conjugate relationship between the reflecting mirror 77 and the BD sensor 72 with respect to the sub scanning section. In the case where such an optical element is used, an irradiation position on the BD sensor 72, which is changed due to a tangle error of the reflecting mirror 77 can be corrected.

In this embodiment, the reflecting mirror 77 is disposed on the optical path from the light source means 11 to the optical deflector 5 and on the optical path from the optical deflector 5 to the BD sensor 72. Accordingly, there is an advantage in that a long optical path length can be ensured while keeping the incident optical system and the BD optical system compact. In particular, in the case of the multi-beam scanning optical device, in order to detect the synchronization of the plurality of light fluxes by the single BD sensor 72, it is necessary to sufficiently separate the light fluxes from one another on the BD sensor 72 in the main scanning direction. Thus, it is required that the focal distance of the BD lens 74 within the main scanning section is further lengthened.

Parameter values of the respective elements in the scanning optical device according to this embodiment are as follows:

focal distance of scanning lens system within main scanning section $f_{f\theta}$=150;

imaging magnification of scanning lens system within sub scanning section $|\beta_{f\theta}|$=1.38;

focal distance of cylindrical lens within sub scanning section $f_{c1}$=114;

focal distance of BD lens within main scanning section $f_{BD}$=96.

The above-mentioned parameter values satisfy the conditional expressions (1) and (2).

In this embodiment, the conditions $$50 < f_{BD} < 150 \quad (1),$$

$$f_{c1} > 54.4 \quad (2)$$

may be satisfied. Both the focal distance $f_{c1}$ of the cylindrical lens 4 within the sub scanning section and the focal distance $f_{BD}$ of the BD lens 74 within the main scanning section satisfy these conditions.

Also, in this embodiment, a relationship expression, $$f_{c1} \times |\beta_{f\theta}| = f_{f\theta}$$

is established. In other words, because a diameter of diaphragm on the surface to be scanned 8 becomes substantially a circle and thus the F number in the main scanning direction becomes equal to the F number in the sub scanning direction. Therefore, the coupling efficiency of the collimator lens 2 can be further improved.

As described above, according to this embodiment, as in the above-mentioned Embodiment 1, the cylindrical lens 4 and the BD lens 74 each are composed of a separate optical element. In addition, assuming the deflection point P, at which the light flux traveling toward the scanning center is deflected on the optical deflector 5, as the reference, the distance from the deflection point P to the cylindrical lens 4 is made longer than the distance to the BD lens 74. Thus, the incident optical system and the BD optical system in which the increase in precision of the synchronous detection and the improvement in coupling efficiency of the collimator lens 2 are both achieved can be compactly and simply constructed.

Further, with respect to the feature inherent in this embodiment, the reflecting mirror 77 is disposed on the optical path from the light source means 11 to the optical deflector 5 and on the optical path from the optical deflector 5 to the BD sensor 72. Therefore, a long optical path length can be ensured while keeping the incident optical system and the BD optical system compact. Therefore, the plurality of light fluxes are easily separated from one another on the BD sensor 72 and the coupling efficiency of the collimator lens 2 can be further improved.

Image Forming Apparatus

Figure 4:
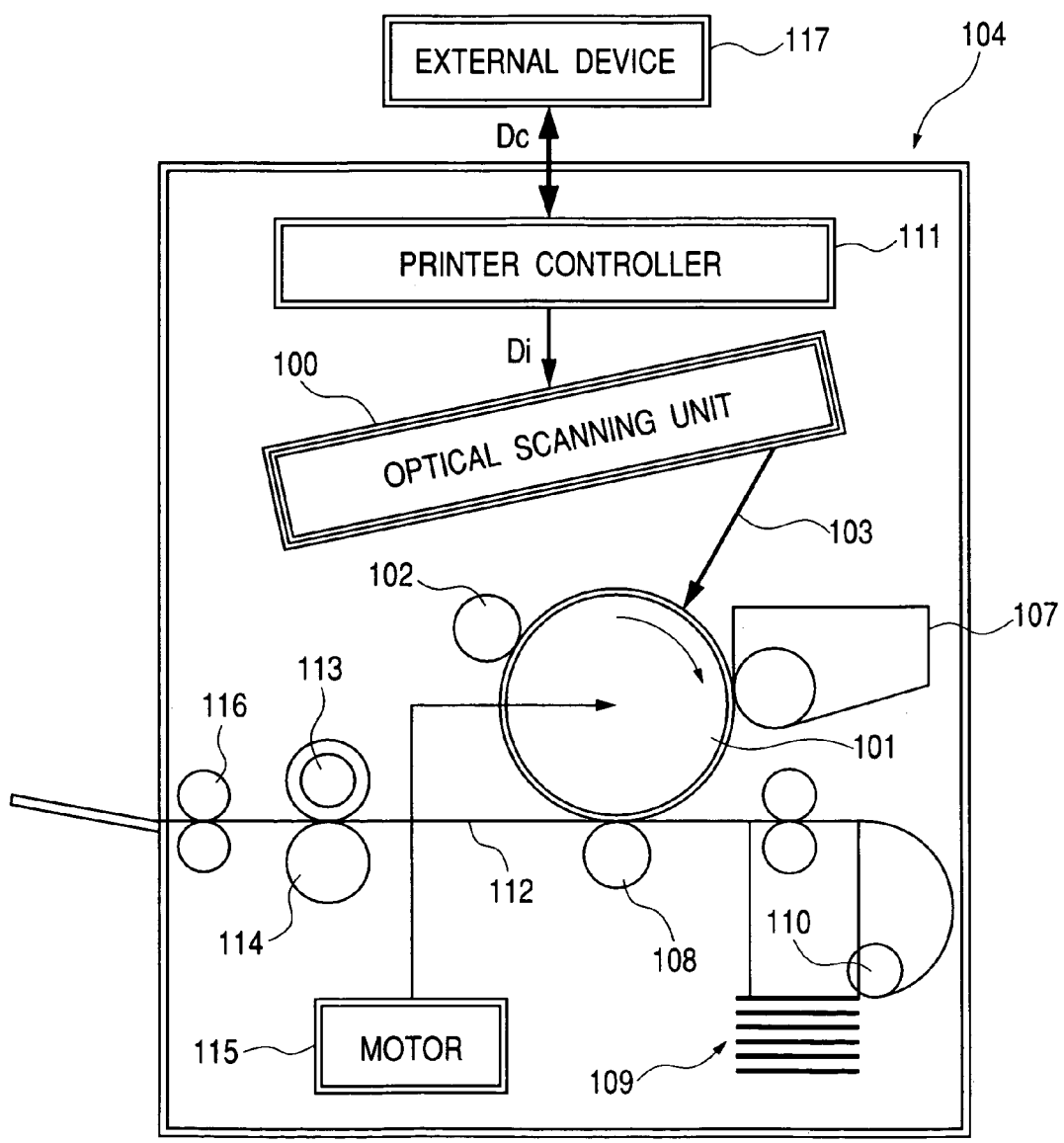
FIG. 4 is a sub scanning sectional diagram showing an image forming apparatus according to an embodiment of the present invention.

FIG. 4 is a main part sectional view showing an image forming apparatus in the sub scanning direction, according to an embodiment of the present invention. In FIG. 4, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus 104. The image data Di is inputted to an optical scanning unit 100 having the structure indicated in Embodiments 1 and 2. A light beam 103 modulated according to the image data Di is emitted from the optical scanning unit 100, and the photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. According to the rotation, the photosensitive surface of the photosensitive drum 101 is moved in the sub scanning direction orthogonal to the main scanning direction with respect to the light beam 103. A charging roller 102 for uniformly charging the surface of the photosensitive drum 101 is provided above the photosensitive drum 101 so as to be contact with the surface thereof. The surface of the photosensitive drum 101, which is charged by the charging roller 102, is irradiated with the light beam 103 for scanning by the optical scanning unit 100.

As described earlier, the light beam 103 is modulated according to the image data Di. The surface of the photosensitive drum 101 is irradiated with the light beam 103 to form an electrostatic latent image thereon. The electrostatic latent image is developed as a toner image by a developing unit 107 provided in the downstream side from the irradiation position of the light beam 103 in the rotational direction of the photosensitive drum 101 so as to be contact with the photosensitive drum 101.

The toner image developed by the developing unit 107 is transferred onto a sheet 112 serving as a material to be transferred by a transfer roller 108 provided below the photosensitive drum 101 so as to oppose to the photosensitive drum 101. The sheet 112 is contained in a sheet cassette 109 located in the front (right side in FIG. 4) of the photosensitive drum 101. Manual feed is also possible. A feed roller 110 is provided in the end portion of the sheet cassette 109. The sheet 112 in the sheet cassette 109 is sent to a transport path.

By the above operation, the sheet 112 to which an unfixed toner image is transferred is further transported to a fixing device located in the rear (left side in FIG. 4) of the photosensitive drum 101. The fixing device is composed of a fixing roller 113 having a fixing heater (not shown) therein and a pressure roller 114 provided to press the fixing roller 113. The sheet 112 transported from the transferring part is heated while it is pressurized by the press-contacting part between the fixing. roller 113 and the pressure roller 114, so that the unfixed toner image on the sheet 112 is fixed. Further, a delivery roller 116 is provided in the rear of the fixing roller 113, and the sheet 112 with the fixed toner image is delivered to the outside of the image forming apparatus.

Although not shown in FIG. 4, the printer controller 111 conducts not only data conversion described earlier but also control of each part of the image forming apparatus, which is represented by the motor 115, control of a polygon motor in an optical scanning unit as described later, and the like.

(Embodiment 3)

Figure 5:
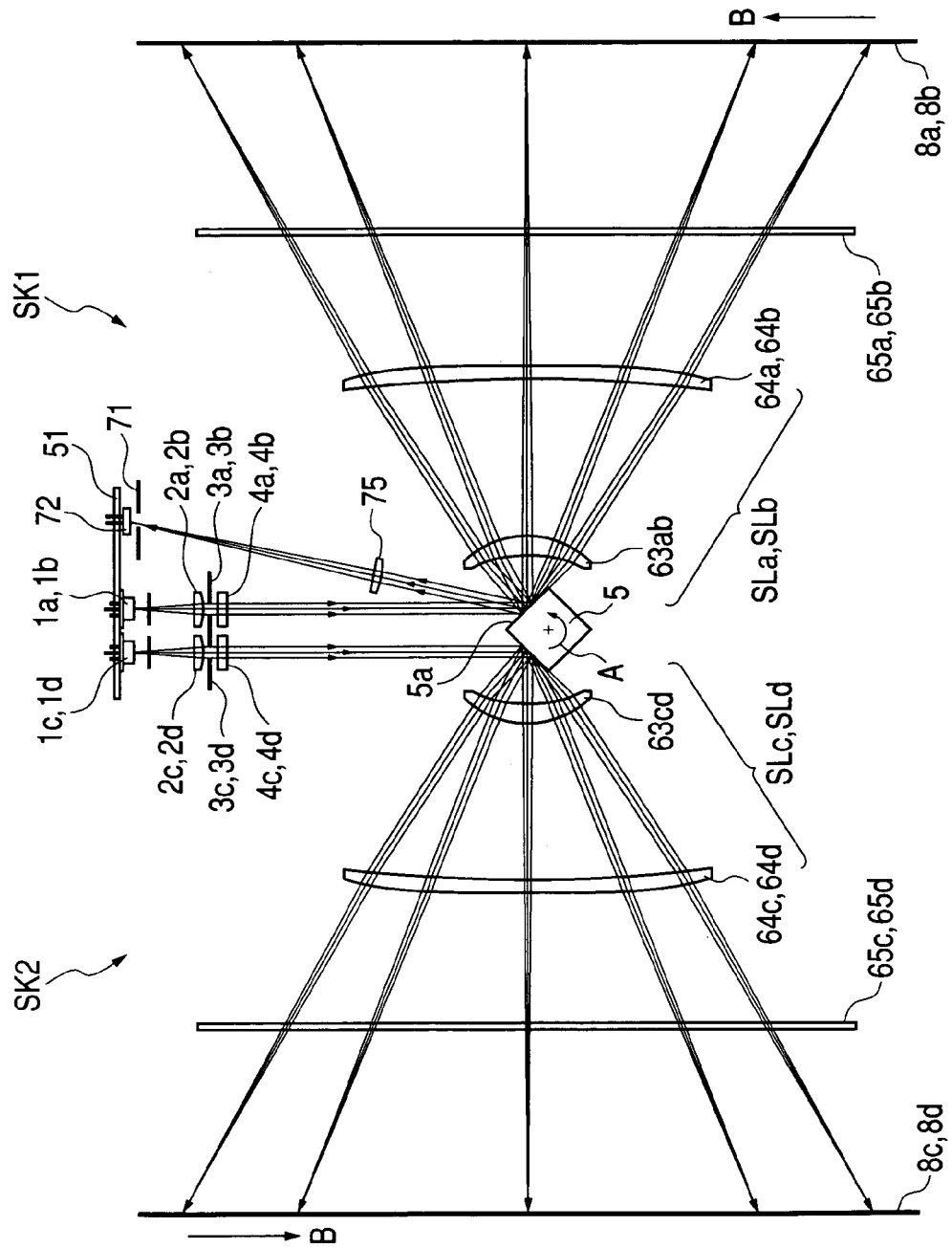
FIG. 5 is a main scanning sectional view showing Embodiment 3 of the present invention.
Figure 6:
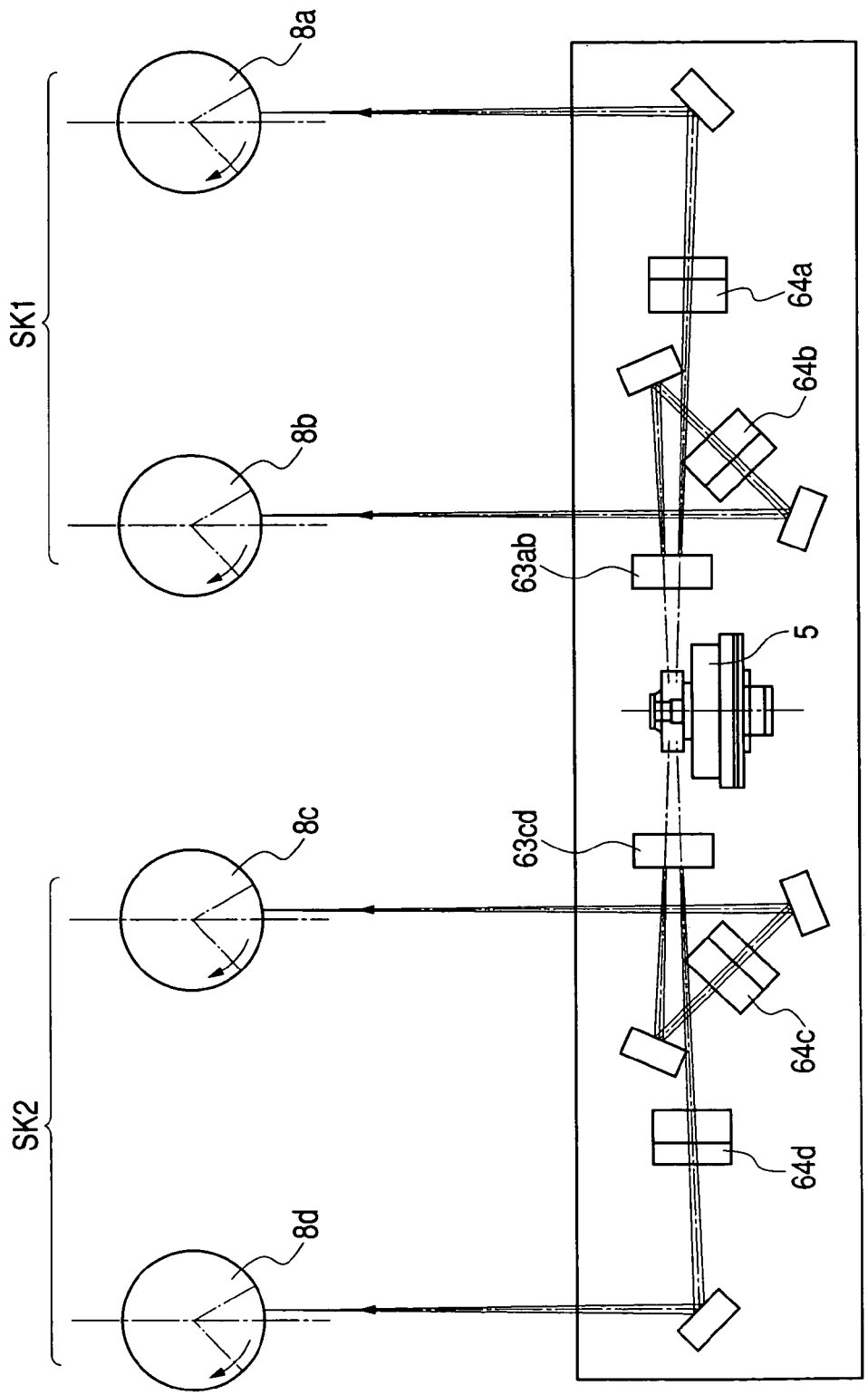
FIG. 6 is a sub scanning sectional view showing Embodiment 3 of the present invention.

FIG. 5 is a main part sectional view showing a scanning optical device in the main scanning direction, according to Embodiment 3 of the present invention (main scanning sectional view). FIG. 6 is a main part sectional view showing the scanning optical device of FIG. 5 in the sub scanning direction (sub scanning sectional view). In FIGS. 5 and 6, the same reference numerals are provided to the same elements as shown in FIG. 1.

In this embodiment, points different from the above-mentioned Embodiment 1 are that: the present invention is applied to a tandem type scanning optical device in which a plurality of surfaces to be scanned 8a to 8d are simultaneously scanned with light fluxes emitted from a plurality of light source means 1a to 1d; and the tandem type scanning optical device is mounted on a color image forming apparatus. Other structures and optical actions are substantially the same as Embodiment 1, and the same effect is obtained.

In other words, in FIGS. 5 and 6, SK1 denotes a first scanner and SK2 denotes a second scanner. The first scanner SK1 includes: light source means (1a, 1b); collimator lenses (2a, 2b) that convert a plurality of light fluxes emitted from the light source means (1a, 1b) into substantially parallel light fluxes; aperture stops (3a, 3b) that regulate the plurality of light fluxes from the collimator lenses (2a, 2b); cylindrical lenses (4a, 4b) that image the plurality of light fluxes as linear images extended in the main scanning direction; the single optical deflector 5 serving as a deflection element; and scanning lens systems (SLa, SLb) that form the plurality of light fluxes which are reflected and deflected on the optical deflector 5 in spot shapes on corresponding photosensitive drum surfaces (8a, 8b) serving as surfaces to be scanned. The second scanner SK2 includes: light source means (1c, 1d); collimator lenses (2c, 2d) that convert a plurality of light fluxes emitted from the light source means (1c, 1d) into substantially parallel light fluxes; aperture stops (3c, 3d) that regulate the plurality of light fluxes from the collimator lenses (2c, 2d); cylindrical lenses (4c, 4d) that image the plurality of light fluxes as linear images extended in the main scanning direction; the single optical deflector 5 serving as a deflection element; and scanning lens systems (SLc, SLd) that form the plurality of light fluxes which are reflected and deflected on the optical deflector 5 in spot shapes on corresponding photosensitive drum surfaces (8c, 8d) serving as surfaces to be scanned.

The scanning lens systems (SLa, SLb, SLc, SLd) each have two toric lenses, i.e., first and second toric lenses (63ab, 64a, 64b; 63cd, 64c, 64d), each of which is made of a plastic material. According to the scanning lens systems, the plurality of light fluxes which are reflected and deflected on the optical deflector 5 are imaged in spot shapes onto the corresponding photosensitive drum surfaces (8a, 8b, 8c, 8d). In addition, the scanning lens systems (SLa, SLb, SLc, SLd) each have a tangle error correcting function in the case where a conjugate relationship is made between the vicinity of the reflection surface 5a of the optical deflector 5 and the vicinity of the photosensitive drum surfaces (8a, 8b, 8c, 8d) within the sub scanning section.

A synchronous detection optical lens serving as a fourth optical element (BD lens) 75 is composed of an anamorphic lens which has different refractive powers within the main scanning section and the sub scanning section and is made of a plastic material. By means of the synchronous detection optical lens, a light flux (BD light flux) is imaged at the position where a synchronous detection element 72 is disposed or in the vicinity thereof, within the main scanning section.

In this embodiment, the same optical deflector 5 is commonly used for the first scanner SK1 and the second scanner SK2. In addition, a light flux which is reflected and deflected on a different deflection surface of the optical deflector 5 is used for each of the first scanner SK1 and the second scanner SK2.

In this embodiment, a plurality of light fluxes emitted from the plurality of light source means (semiconductor lasers) 1a to 1d are converted into substantially parallel light fluxes by the collimator lenses 2a to 2d. The light fluxes (the amount of light) are limited by the aperture stops 3a to 3d and then incident into the cylindrical lenses 4a to 4d. Of the substantially parallel light fluxes incident into the cylindrical lens 4a to 4d, light fluxes within the main scanning section exits without being changed in its optical state. Light fluxes within the sub scanning section are converged and imaged as substantial linear images (linear images extended in the main scanning direction) onto the deflection surfaces of the optical deflector 5. Then, the plurality of light fluxes which are reflected and deflected on the deflection surfaces of the optical deflector 5 are imaged in spot shapes onto the photosensitive drum surfaces 8a to 8d through the scanning lens systems (SLa, SLb, SLc, SLd) and protection-against-dust glasses 65a to 65d. At this time, the optical deflector 5 is rotated in a direction indicated by an arrow A, so that the photosensitive drum surfaces 8a to 8d are optically scanned in a direction indicated by an arrow B (main scanning direction) at a constant speed. Consequently, image recording is conducted on the photosensitive drum surfaces 8a to 8d composing recording mediums.

At this time, in order to adjust the timing of the scanning start position on the photosensitive drum surfaces 8a to 8d before optical scanning is conducted on the photosensitive drum surfaces 8a to 8d, a part of the light fluxes (BD light fluxes) which are reflected and deflected on the optical deflector 5 is condensed onto the surface of the BD slit 71 by the BD lens 75 and then guided to the BD sensor 72. Then, the timing of the scanning start position for image recording on each of the photosensitive drum surfaces 8a to 8d is adjusted based on the synchronous signal (BD signal) obtained by detecting an output signal from the BD sensor 72.

Note that, in this embodiment, the single optical deflector is used and applied to a tandem type scanning optical device in which a part of toric lenses (scanning optical elements) is commonly used for a plurality of light fluxes. However, the present invention is not limited to this. For example, the present invention can be achieved for all tandem type scanning optical devices regardless of the number of optical elements such as optical deflectors, toric lenses, or cylindrical lenses, and there is no limitation on the number of optical elements.

Also, in this embodiment, the synchronous detection is conducted using only the single BD light flux and the other BD light fluxes are controlled based on the synchronous signal obtained from signal data of the other BD light fluxes in consideration of a divisional error and the like. The number of BD light fluxes for direct synchronous detection may be increased to two or more and the present invention is not limited to the number of BD light fluxes.

Parameter values of the respective elements in the scanning optical device according to this embodiment are as follows:

focal distance of scanning lens system within main scanning section $f_{f\theta}=150$;

imaging magnification of scanning lens system within sub scanning section $|\beta_{f\theta}|=1.38$;

focal distance of cylindrical lens within sub scanning section $f_{c1}=96$;

focal distance of BD lens within main scanning section $f_{BD}=76.4$.

The above-mentioned parameter values satisfy the conditional expressions (1) and (2).

In this embodiment, the conditions $$50 < f_{BD} < 150 \qquad (1),$$

$$f_{c1} > 54.4 \qquad (2)$$

may be satisfied. Both the focal distance $f_{c1}$ of the cylindrical lens 4 within the sub scanning section and the focal distance $f_{BD}$ of the BD lens 73 within the main scanning section satisfy these conditions.

According to this embodiment, in order to compactly dispose an optical system while satisfying these conditions, the cylindrical lens 4 and the BD lens 75 each are composed of a separate optical element. In addition, in the case where the deflection point P at which the light flux traveling toward the scanning center is deflected on the optical deflector 5 is assumed as the reference, the distance to the cylindrical lens 4 becomes longer than the distance to the BD lens 75. Thus, the incident optical system and the BD optical system can be compactly and simply constructed, the systems attaining higher precision in the synchronous detection while attaining improvement in the coupling efficiency of the collimator lens 2.

Color Image Forming Apparatus

Figure 7:
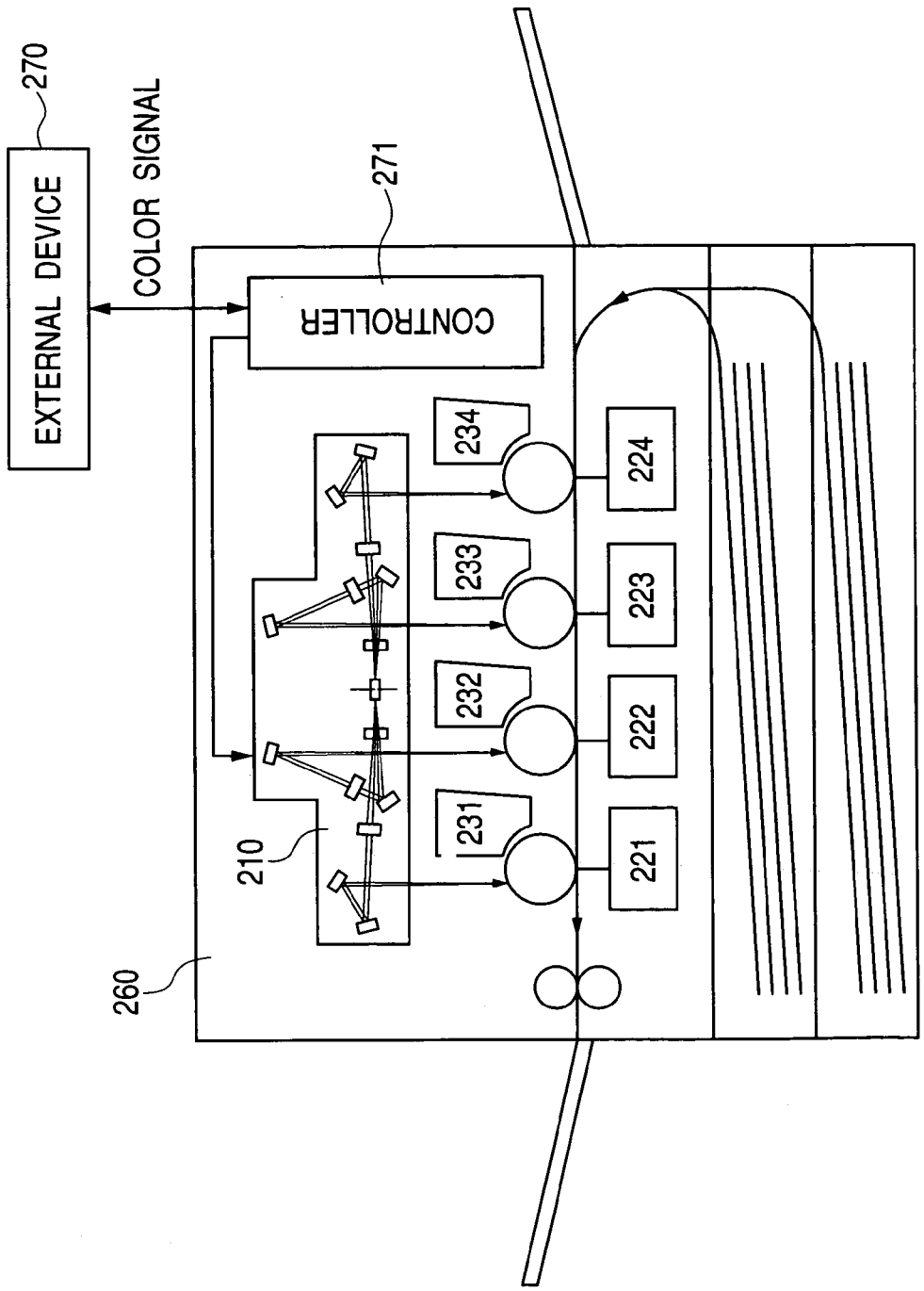
FIG. 7 is a sub scanning sectional diagram showing a color image forming apparatus according to an embodiment of the present invention.
Figure 8:
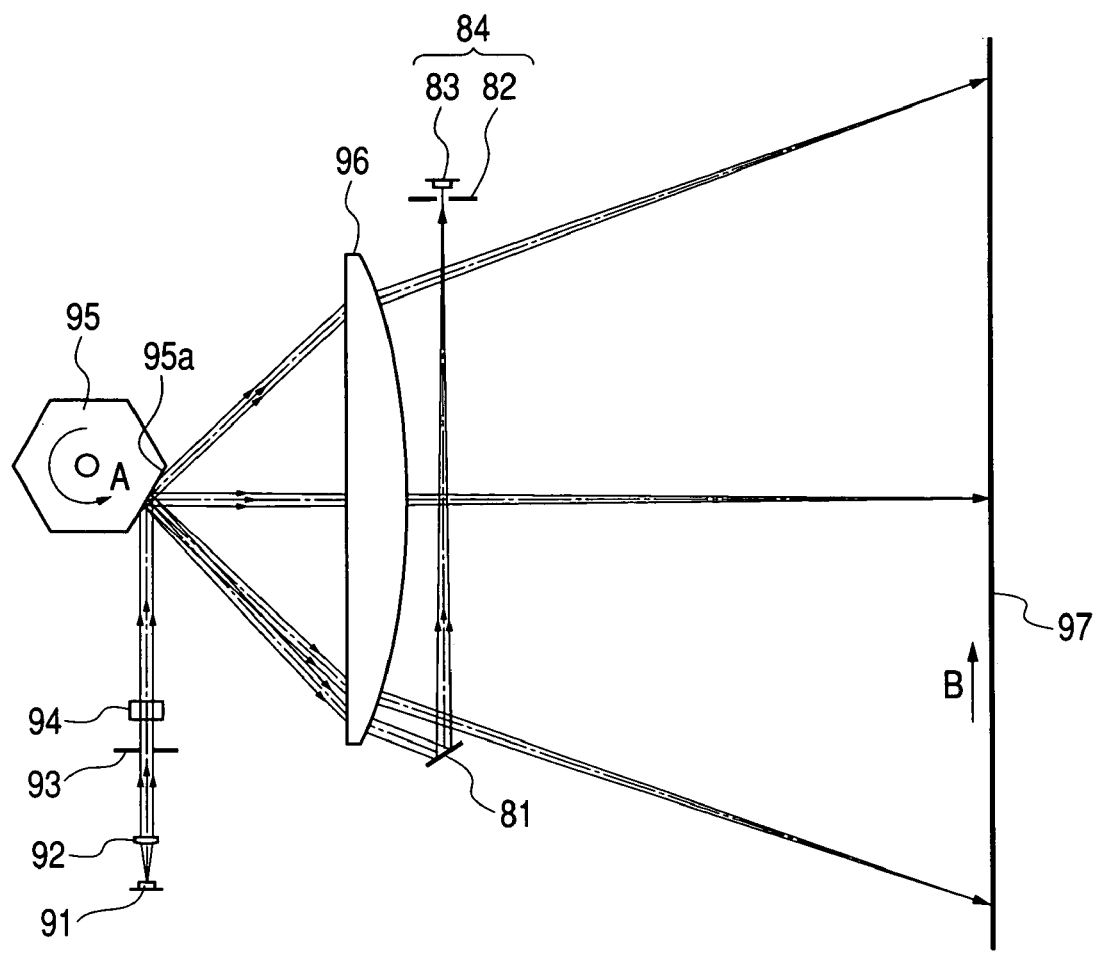
FIG. 8 is a schematic view of a main part of a conventional scanning optical device.

FIG. 7 is a main part schematic diagram showing a color image forming apparatus according to an embodiment of the present invention. This embodiment shows a tandem type color image forming apparatus that irradiates the surface of a photosensitive drum serving as an image bearing member with four light fluxes from a scanning optical device to record image information. In FIG. 7, reference numeral 260 denotes a color image forming apparatus; 210, a scanning optical device having the structure described in Embodiment 3; 221, 222, 223 and 224, respective photosensitive drums serving as image bearing members; and 231, 232, 233, and 234, respective developing units.

In FIG. 7, respective color signals of R (red), G (green), and B (blue) are inputted from an external device 270 such as a personal computer to the color image forming apparatus 260. The color signals are converted into respective image data (dot data) of C (cyan), M (magenta), Y (yellow), and B (black) by a printer controller 271 in the color image forming apparatus 260. These image data are inputted to the scanning optical device 210. Light beams 103 modulated according to the respective image data are emitted from the scanning optical device 210. The photosensitive surfaces of the photosensitive drums 221, 222, 223 and 224 are scanned with the light beams in the main scanning direction.

According to the color image forming apparatus in this embodiment, as described above, latent images of the respective colors are formed on the corresponding surfaces of the photosensitive drums 221, 222, 223 and 224 using four light fluxes which correspond to respective color light fluxes from the scanning optical device and are based on image data. After that, multi-transfer is conducted on a recording material to produce a full color image.

For example, a color image reading apparatus including a CCD sensor may be used as the external device 270. In this case, the color image reading apparatus and the color image forming apparatus 260 compose a color digital copying machine.

As described above, according to this embodiment, as in Embodiment 1, the cylindrical lens and the BD lens each are composed of a separate optical element. In addition, in the case where the deflection point P at which the light flux traveling toward the scanning center is deflected on the optical deflector 5 is assumed as the reference, it is constructed such that the distance to the cylindrical lens becomes longer than the distance to the BD lens. Thus, the incident optical system and the BD optical system can be compactly and simply constructed, the systems attaining higher precision in the synchronous detection while attaining improvement in the coupling efficiency of the collimator lens.

Further, with respect to the feature inherent in this embodiment, the present invention is applied to the tandem type scanning optical device and the color image forming apparatus. Thus, even in the case of a tandem type scanning optical device in which the number of parts is large and the degree of freedom in arrangements is small, the synchronous detection can be easily conducted in compact arrangements.

According to the present invention, as described above, the cylindrical lens and the synchronous detection optical element each are composed of a separate optical element. In addition, in the case where the point at which a main light beam traveling toward the scanning center on the surface to be scanned is deflected on the deflection element is assumed as the reference point, the cylindrical lens is located at a position which is farther from the reference point than the synchronous detection optical element. Thus, there can be achieved a scanning optical device in which the incident optical system and the synchronous detection optical system can be compactly and simply constructed, the systems attaining higher precision in the synchronous detection while attaining improvement in the coupling efficiency of the collimator lens. In addition, an image forming apparatus using the scanning optical device can be achieved.

What is claimed is:

1. A scanning optical apparatus comprising:
   light source means;
   a first optical element that converts a light flux emitted from the light source means;
   a second optical element that converts the light flux emitted from the first optical element into a longitudinal linear image in a main scanning direction;
   a deflection element that scanningly deflects the light flux emitted from the second optical element;
   a third optical element that guides the light flux deflected by the deflection element to a surface to be scanned;
   a synchronous detection element that obtains a synchronous signal; and
   a fourth optical element that guides the light flux deflected by the deflection element to the synchronous detection element,
   wherein in a case where a point at which a principal ray traveling toward a scanning center on the surface to be scanned is deflected by the deflection element is assumed as a deflection point, the second optical element is located at a position which is farther from the deflection point than the further optical element, and
   wherein in a case where a focal distance of the third optical element within a main scanning section is given as $f_{f\theta}$ and a focal distance of the fourth optical element within the main scanning section is given as $f_{BD}$, a condition, $$f_{f\theta}/3 < f_{BD} < f_{f\theta}$$

is satisfied.

2. A scanning optical apparatus comprising:
   light source means;
   a first optical element that converts a light flux emitted from the light source means;
   a second optical element that converts the light flux emitted from the first optical element into a longitudinal linear image in a main scanning direction;
   a deflection element that scanningly deflects the light flux emitted from the second optical element;
   a third optical element that guides the light flux deflected by the deflection element to a surface to be scanned;
   a synchronous detection element that obtains a synchronous signal; and
   a fourth optical element that guides the light flux deflected by the deflection element to the synchronous detection element,
   wherein in a case where a point at which a principal ray traveling toward a scanning center on the surface to be scanned is deflected by the deflection element is assumed as a deflection point, the second optical element is located at a position which is farther from the deflection point than the further optical element, and wherein in a case where a focal distance of the third optical element within a main scanning section is given as $f_{f\theta}$, an imaging magnification of the third optical element within a sub scanning section is given as $\beta_{f\theta}$, and a focal distance of the second optical element within the sub scanning section is given as $f_{cl}$, a condition, $$f_{c1} > f_{f\theta}/(2|\beta_{f\theta}|)$$

is satisfied.

3. An image forming apparatus, comprising:
a scanning optical device according to either one of claims 1 or 2;
a photosensitive member disposed on a surface to be scanned;
a developing unit that develops, as a toner image, an electrostatic latent image, which is formed on the photosensitive member scanned by the scanning optical device using a light flux;
a transferring unit that transfers the developed toner image to a material to be transferred; and
a fixing device that fixes the transferred toner image to the material to be transferred.

4. An image forming apparatus, comprising:
a scanning optical device according to either one of claims 1 or 2; and
a printer controller that converts code data inputted from an external device into an image signal and outputs the image signal to the scanning optical device.

5. A scanning optical apparatus for scanning a plurality of surfaces to be scanned, comprising:
a plurality of light source means;
a pluarlity of first optical elements that convert light fluxes emitted from the plurality of light source means;
at least one second optical element that converts the plurality of light fluxes emitted from the plurality of first optical elements into longitudinal linear images in a main scanning direction;
at least one deflection element that scanningly deflects the plurality of light fluxes from the at least one second optical element;
at least one third optical element that guides the plurality of light fluxes emitted from the at least one deflection element to the plurality of surfaces to be scanned;
at least one synchronous detection element that obtains a synchronous signal; and
at least one fourth optical element that guides the plurality of light fluxes emitted from the at least one deflection element to the at least one synchronous detection element,
wherein in a case where a point at which a principal ray traveling toward a scanning center on the surface to be scanned is deflected by the deflection element is assumed as a deflection point, the second optical element is located at a position which is farther from the deflection point than the fourth optical element, and
wherein in a case where a focal distance of the third optical element within a main scanning section is given as $f_{f\theta}$ and a focal distance of the fourth optical element within the main scanning section is given as $f_{BD}$, a condition, $$f_{f\theta}/3 < f_{BD} < f_{f\theta}$$

6. A scanning optical apparatus for scanning a plurality of surfaces to be scanned, comprising:
a plurality of light source means;
a plurality of first optical elements that convert light fluxes emitted from the plurality of light source means;
at least one second optical element that converts the plurality of light fluxes emitted from the plurality of first optical elements into longitudinal linear images in a main scanning direction;
at least one deflection element that scanningly deflects the plurality of light fluxes from the at least one second optical element;
at least one third optical element that guides the plurality of light fluxes emitted from the at least one deflection element to the plurality of surfaces to be scanned;
at least one synchronous detection element that obtains a synchronous signal; and
at least fourth optical element that guides the plurality of light fluxes emitted from the at least one deflection element to the at least one synchronous detection element,
wherein in a case where a point at which a principal ray traveling toward a scanning center on the surface to be scanned is deflected by the deflection element is assumed as a deflection point, the second optical element is located at a position which is farther from the deflection point than the fourth optical element, and
wherein in a case where a focal distance of the third optical element within a main scanning section is given as $f_{f\theta}$, an imaging magnification of the third optical element within a sub scanning section is given as $\beta_{f\theta}$, and a focal distance of the second optical element within the sub scanning section is given as $f_{c1}$, a condition, $$f_{c1} > f_{f\theta}/(2|\beta_{f\theta}|)$$

is satisfied.

7. A color image forming apparatus, comprising:
a scanning optical device according to either one of claims 5 or 6;
a plurality of photosensitive members disposed on the plurality of surfaces to be scanned;
a plurality of developing units that develop, as toner images, electrostatic latent images, which are formed on the photosensitive members scanned by the scanning optical device using the plurality of light fluxes;
a plurality of transferring units that transfer the developed toner images to materials to be transferred; and
a fixing device that fixes the transferred toner images to the materials to be transferred.

8. A color image forming apparatus, comprising:
a scanning optical device according to either one of claims 5 or 6; and
a printer controller that converts code data inputted from an external device into an image signal and outputs the image signal to the scanning optical device.

* * * * *

UNITED STATES PATENT AND TRADEMARK OFFICE
CERTIFICATE OF CORRECTION

PATENT NO. : 7,064,877 B2
APPLICATION NO. : 10/725398
DATED : June 20, 2006
INVENTOR(S) : Manabu Kato It is certified that error appears in the above-identified patent and that said Letters Patent is hereby corrected as shown below:

COLUMN 2
    Line 66, "Id" should read --is--.

COLUMN 11
    Line 59, "exits" should read --exit--, and "its" should read --their--.

COLUMN 15
    Line 34, "pluarlity" should read --plurality--.

COLUMN 16
    Line 1, "given" should read --given as--;
    Line 3, "is satisfied" should be inserted after the equation; and
    Line 21, "fourth" should read --one fourth--.

Signed and Sealed this

Ninth Day of January, 2007

JON W. DUDAS
*Director of the United States Patent and Trademark Office*